US 8,553,678 B2

(12) United States Patent
Huotari et al.

(10) Patent No.: US 8,553,678 B2
(45) Date of Patent: Oct. 8, 2013

(54) DISTRIBUTED CODEC FOR PACKET-BASED COMMUNICATIONS

(75) Inventors: Allen J. Huotari, Garden Grove, CA (US); Kendra S. Harrington, Irvine, CA (US); Matthew B. McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1188 days.

(21) Appl. No.: 11/243,881

(22) Filed: Oct. 4, 2005

(65) Prior Publication Data

US 2007/0076697 A1    Apr. 5, 2007

(51) Int. Cl.
*H04L 29/00* (2006.01)
*H04L 29/06* (2006.01)
*H04L 29/10* (2006.01)
*H04L 12/66* (2006.01)

(52) U.S. Cl.
USPC ..... 370/352; 370/389; 370/395.3; 370/395.5; 370/422; 370/465

(58) Field of Classification Search
USPC ......................................................... 370/352
See application file for complete search history.

(56) References Cited

U.S. PATENT DOCUMENTS

| | | | |
|---|---|---|---|
| 6,215,784 B1 * | 4/2001 | Petras et al. ................. 370/356 |
| 6,442,610 B1 * | 8/2002 | Khanna et al. ................ 709/227 |
| 6,515,964 B1 * | 2/2003 | Cheung et al. ................ 370/230 |
| 6,535,521 B1 * | 3/2003 | Barghouti et al. ............ 370/462 |
| 6,628,644 B1 * | 9/2003 | Nelson et al. ................. 370/352 |
| 6,847,704 B1 | 1/2005 | Cherchali et al. |
| 2001/0004361 A1 * | 6/2001 | Kobayashi .................... 370/401 |
| 2002/0114318 A1 * | 8/2002 | Rines ............................ 370/352 |
| 2002/0146000 A1 | 10/2002 | Jonsson et al. |
| 2003/0023714 A1 | 1/2003 | Ziegler et al. |
| 2003/0072330 A1 * | 4/2003 | Yang et al. .................... 370/493 |
| 2003/0227903 A1 * | 12/2003 | Watson ......................... 370/352 |
| 2004/0062231 A1 * | 4/2004 | Wyatt ............................ 370/352 |
| 2004/0196836 A1 * | 10/2004 | Takahashi ..................... 370/352 |
| 2005/0047389 A1 | 3/2005 | Bond et al. |
| 2005/0105512 A1 | 5/2005 | Myhre et al. |
| 2005/0180396 A1 * | 8/2005 | Lim .............................. 370/352 |
| 2005/0216949 A1 * | 9/2005 | Candelora et al. ............ 725/134 |
| 2006/0093104 A1 * | 5/2006 | Maytal et al. .............. 379/93.28 |

* cited by examiner

*Primary Examiner* — Andrew Chriss
*Assistant Examiner* — Joshua A Kading
(74) *Attorney, Agent, or Firm* — Haynes and Boone, LLP

(57) ABSTRACT

A packet-based communications system is provided, including: a client communications module for transmitting digital audio signals to a user interface device over a local area network (LAN) and for receiving digital audio signals from the user interface device, a voice packet module configured to: receive audio signals from the client communications module and encapsulate the audio signals into data packets; convert data packets into audio signals and transmit the audio signals to the client communications module, and a network protocol module for transmitting data packets between the voice packet module and an Internet Protocol (IP) network.

15 Claims, 8 Drawing Sheets

DISTRIBUTED CODEC FOR PACKET-BASED COMMUNICATIONS

BACKGROUND

With the increase in residential broadband connections, the use of packet-based systems for voice communications has increased as well. One popular communications system is known as Voice over Internet Protocol (VoIP), which enables the routing of voice conversations over the Internet or other Internet Protocol (IP) networks.

One conventional VoIP implementation utilizes an analog telephone adapter (ATA), which is a device used to connect one or more standard analog telephones to a VoIP network. The ATA typically includes an Ethernet port for connection with a local area network (LAN) and a RJ-111 telephone port, into which users can plug a standard analog telephone. ATA devices typically use the SIP protocol, which is a standard for initiating, modifying, and terminating an interactive user session involving multimedia elements such as video, voice, and instant messaging. The ATA may be implemented as a standalone, dedicated ATA device, which can be connected to the Ethernet port on a router, or may be incorporated into a multi-function device, such as a residential gateway device, which includes a modem, router, and ATA. Each ATA is configured to support a predefined number of VoIP endpoints (typically one or two endpoints).

One disadvantage of conventional VoIP implementations is that all telephone devices (such as conventional analog telephones or fax machines) must be directly connected to the ATA. It is possible to connect multiple telephone devices to a single ATA by providing the ATA with multiple RJ-111 ports, or by connecting the ATA to a conventional cordless telephone base station having multiple handsets. However, a single ATA can only be used to terminate a predetermined limited number of telephone calls. Thus, if two analog telephones are connected to an ATA that only supports a single VoIP endpoint, only one of the telephones can be used at any given moment. Even if other ATAs are available on the same LAN and are not being used, the telephones connected to the first ATA cannot be used.

In other ATA implementations, the ATA may be combined with a telephone handset to provide a single integrated telephony device. Thus, the handset can have its own dedicated VoIP endpoint, network interface (such as, e.g., an Ethernet port or a wireless IEEE 802.11 interface), and audio subsystem (e.g., microphone and speaker). If multiple handsets are provided in a LAN, each handset is capable of terminating VoIP calls, thereby making all of the handsets simultaneously available to make telephone calls. A disadvantage of this arrangement is that the ATA functionality requires a significant amount of processing power to perform the necessary CODEC (coder-decoder) processes to digitize and compress the audio signal, and to encapsulate that signal into IP packets. This can dramatically increase the cost of each handset. In addition, the high power consumption of the ATA circuitry limits the amount of battery life available for wireless handset implementations.

Accordingly, there is a need for an improved packet-based communications system that enables ATA services to be more efficiently utilized in a network.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
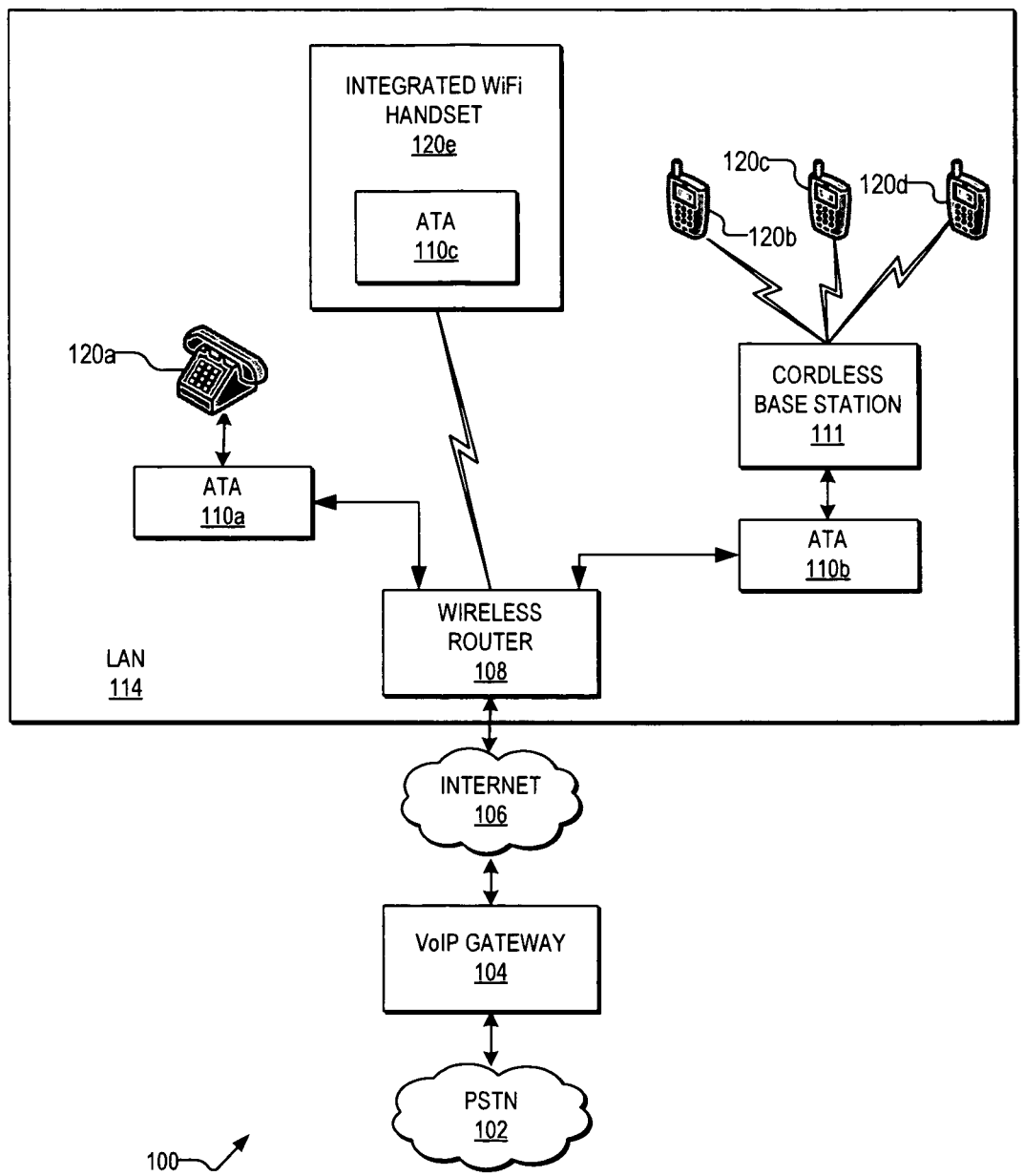
FIG. 1 is a block diagram showing an exemplary voice communications network environment 100 utilizing conventional VoIP implementations.

FIG. 1 is a block diagram showing a VoIP network environment 100 utilizing conventional VoIP implementations. Telephone calls with telephone numbers in the public switched telephone network (PSTN) 102 pass through a VoIP gateway 104, which provides translation services between the PSTN 102 and endpoints coupled to IP networks, such as the Internet 106. A wireless router/modem 108 serves as a gateway between a LAN 114 and the Internet 106. The LAN 114 includes three ATAs 110a-110c. The first ATA 110a comprises a standalone, dedicated ATA 110a having an Ethernet port for direct connection to the router 108 and a telephone port for direct connection to a conventional analog telephone 120a. The second ATA 110b comprises a dedicated ATA similar to the first ATA 110a. However, instead of being connected to a single telephone 120a, the second ATA 110b is connected to a standard analog cordless telephone base station 111. Three handsets 120b-120d share the single telephone line provided by the telephone base station 111. The third ATA 110c is integrated into a WiFi handset 120e, which communicates wirelessly with the router 108.

In this environment 100, there are five devices 120a-120e which could potentially be utilized to place telephone calls, but only three ATAs 110a-110c, with each ATA 110a-110c being configured to support a single VoIP endpoint. Because each device 120a-120e is only capable of operating with the ATA 110a-110c to which the device 120a-120e is coupled, in some situations a user may not be capable of placing a telephone call, even if there are ATAs available on the LAN 114. For example, when a first user places a telephone call using the handset 120b, the second ATA 110b will be used by the handset 120b to terminate the VoIP call. If a second user wishes to place a telephone call using handset 120c, the second ATA 110b will not be available and the second user must wait until the first user is done, even though the first ATA 110a and third ATA 110c are unused and available.

In accordance with embodiments of the present invention, a user interface communications device, such as a telephone handset, can be used with a plurality of VoIP endpoints without requiring a direct connection between the communications device and the VoIP endpoint. This can enable multiple users, each having their own user interface device, to more efficiently share a limited number of VoIP endpoints available on a network. As a result, users can more efficiently utilize all of the VoIP endpoints existing on the network.

Figure 2:
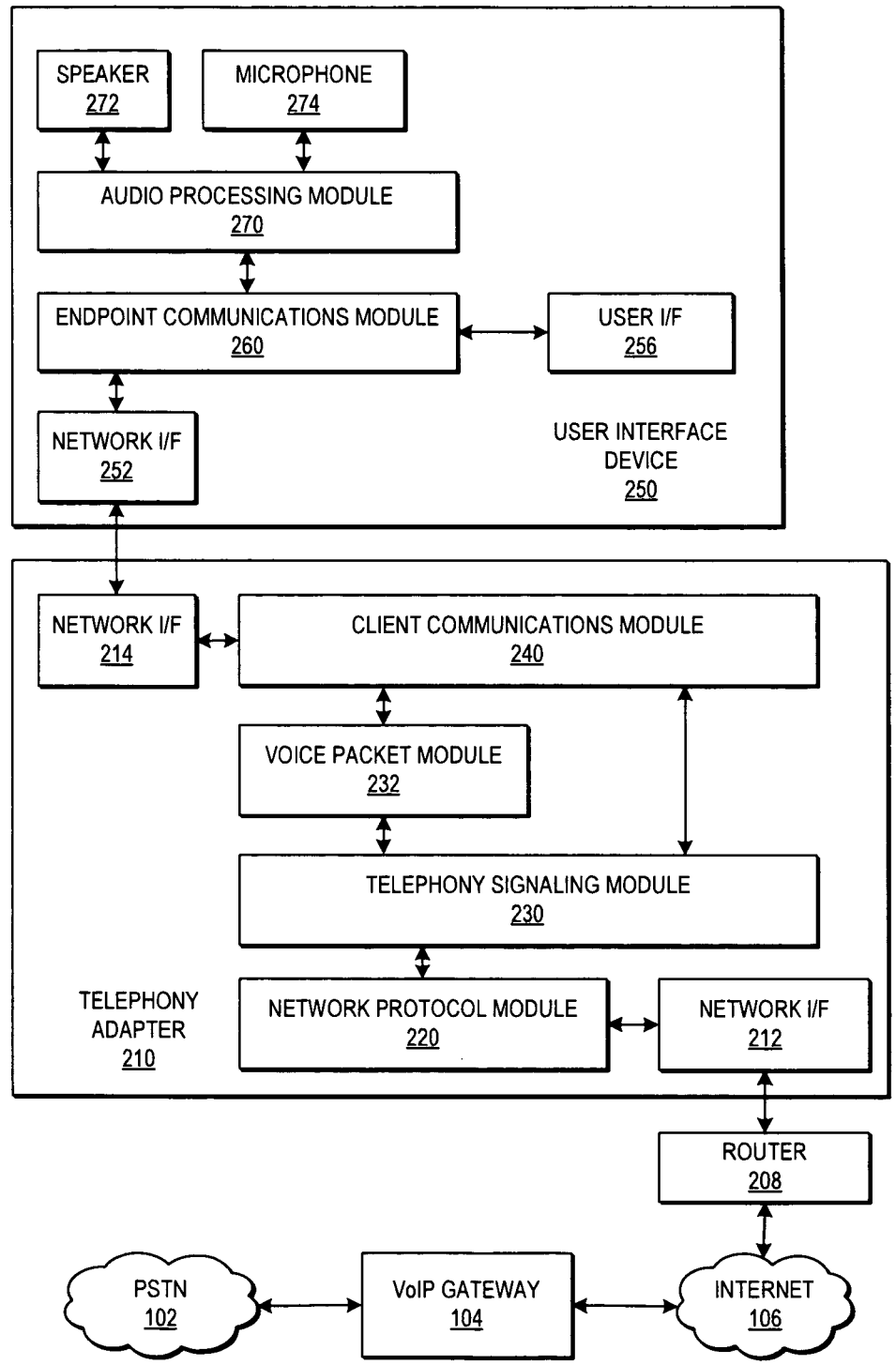
FIG. 2 is a block diagram showing an exemplary voice communications network environment, in accordance with embodiments of the present invention.

FIG. 2 is a block diagram showing an exemplary voice communications network environment 200, in accordance with embodiments of the present invention. The network environment 200 comprises a user interface device 250 coupled to a telephony adapter 210 via a network. The network may comprise a wired or wireless network. The telephony adapter 210 is coupled to an IP network, such as the Internet 106, via a router/modem 208. A VoIP gateway 104 provides translation services between the protocols of the VoIP telephony adapter 210 and the PSTN 102. The user interface device 250 provides the interface to the end user, and the telephony adapter 210 provides the VoIP endpoint functionality for communication with the VoIP gateway 104 and the interface to the user interface device 250, as will be described in greater detail below.

In operation, one or more user interface devices 250 may utilize the telephony adapter 210 as a VoIP endpoint to terminate VoIP calls. The user interface device 25Q, may be implemented as, e.g., a slim client handset, and is configured to serve as the audio subsystem by providing audio output using a speaker 272 and audio input using a microphone 274. The IP signaling stack and CODEC functions, which are computationally intense, can be implemented on the telephony adapter 210, thus relieving the user interface device 250 of much of the processing load. The primary functionality of the user interface device 250 may then be limited to merely managing communication with the telephony adapter 210, and providing the user with bidirectional audio and key press functionality.

The physical and logical decoupling of the user interface device 250 from the VoIP endpoint enables a slim client handset to utilize any unused VoIP endpoint available on the network, even if that endpoint is not physically nearest to the handset. The user interface device 250 may operate essentially as a network attached portable streaming audio device. The user interface device 250 may provide the user with an analog input/output (e.g., microphone/speaker) and limited CODEC functionality, e.g., encoding of analog audio to digital audio (A/D conversion), and decoding of digital audio to analog audio (D/A conversion). Because telephone calls involve bidirectional audio streams, the user interface device 250 may appear as a digital audio source/sink to the telephony adapter 210, and the telephony adapter 210 may appear to the user interface device 250 as a digital audio source/sink as well.

In the embodiment illustrated in FIG. 2, the telephony adapter 210 is configured to advertise itself as a network service on the LAN and/or be discoverable by the user interface device 250. The advertising and discovery process may be performed using a variety of protocols, such as, e.g., SLP (Service Location Protocol), SSDP (Simple Service Discovery Protocol), UPnP (Universal Plug and Play), SIP (Session Initialization Protocol), ZeroConf, and Bluetooth.

The telephony adapter 210 comprises a network interface 212 for coupling with a router 208 and may optionally comprise a second network interface 214 for coupling with a corresponding network interface 252 of the user interface device 250. The second network interface 214 and the network interface 252 of the user interface device 250 may be coupled using, e.g., a wireless interface, such as IEEE 802.11 or Bluetooth.

The user interface device 250 further comprises an endpoint communications module 260, an audio processing module 270, and a user interface 256, which can include, for example, a telephone keypad. The telephony adapter 210 further comprises a network protocol module 220, a telephony signaling module 230, a voice packet module 232, and a client communications module 240.

The audio processing module 270 of the user interface device 250 comprises an analog-to-digital converter (ADC) for converting analog audio signals from the microphone 274 into a digital audio signal and a digital-to-analog converter (DAC) for converting a digital audio signal into an analog audio signal to be output by the speaker 272. In some embodiments, the user interface device 250 may be configured to display graphics or video, in which case the audio processing module 270 is further configured to process graphics and/or video signals. The audio processing module 270 may perform some compression/decompression as part of the codec functionality provided by the user interface device 250.

The endpoint communications module 260 provides the functionality for communicating with the telephony adapter 210. The endpoint communications module 260 provides the network connectivity functionality and the VoIP service discovery functionality.

In the telephony adapter 210, the client communications module 240 is the counterpart to the endpoint communications 260 and enables communication between the user interface device 250 and the telephony adapter 210. The client communications module 240 also provides the VoIP service advertisement functionality. The client communications module 240 and the endpoint communications module 260 may communicate using a variety of communication protocols for setting up the control and audio between devices, such as, e.g., SMS (Short Messaging Service) or SIP (Session Initialization Protocol). The bidirectional audio path can be over a packet-based network, such as IP, using, e.g., HTTP, TCP, RTP, or UDP.

The client communications module 240 receives digital audio signals from the user interface device 250 and passes these signals to the voice packet module 232, which processes the audio signal using voice CODECs and encapsulates the processed information into packets for transmission over an IP network, such as the Internet 106. The audio processing performed by the voice packet module 232 may also include echo cancellation, voice compression, voice-activity detection, jitter removal, and clock synchronization. Similarly, the voice packet module 232 receives IP packets from the Internet 106 and converts them into digital audio signals to be transmitted to the user interface device 250. In other embodiments, the processed information can be transmitted over different types of networks and need not be limited to only IP.

The telephony signaling module 230 detects call control/status information from the user interface device 250, such as key presses into the user interface keypad 256. The telephony signaling module 230 also collects destination address information needed to route telephone calls from the user interface device 250 to their intended destinations.

The network protocol module 220 implements the VoIP stack by receiving the packets from the voice packet module 232 and signaling output from the telephony signaling module 230, and establishes the call and connection, and transmits the packets over the network (e.g., Internet 106).

The user interface device 250 may be implemented in a variety of forms. For example, the user interface device 250 may comprise a slim client handset providing dedicated VoIP functionality. In other embodiments, the user interface device 250 may be implemented as a functional module of a multi-function device, such as a PDA (personal digital assistant) or a PC (personal computer). The telephony adapter 210 may be implemented, e.g., as a stand-alone dedicated VoIP device, or may be implemented as part of a multi-function device, such as a router or a PC.

Figure 3A:
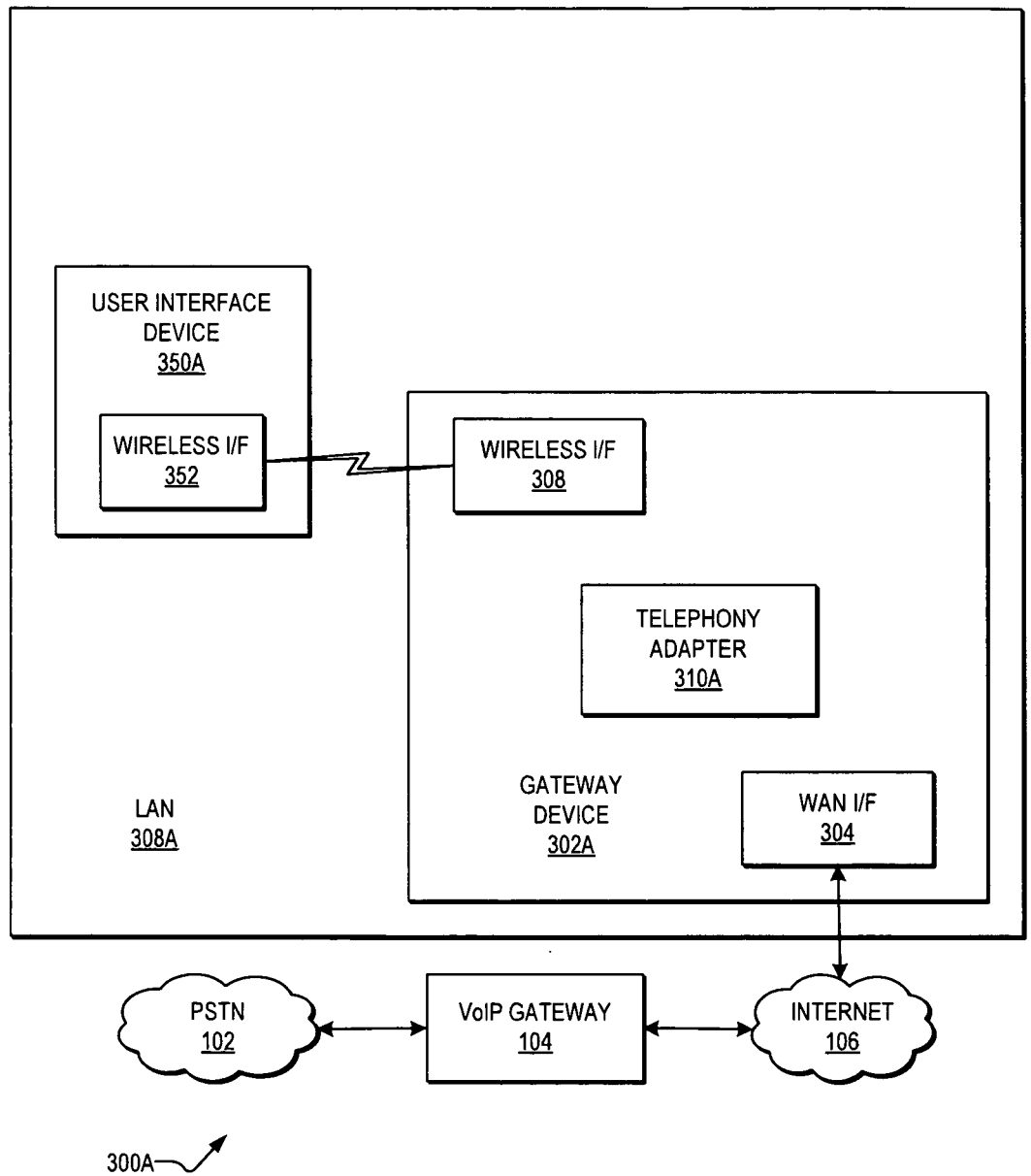
FIGS. 3A-3D are block diagrams of various network environments, in accordance with embodiments of the present invention.

FIG. 3A is a block diagram of a network environment 300A, in accordance with embodiments of the present invention. In this embodiment, the telephony adapter 310A is implemented as part of a wireless gateway device 302A, which includes a WAN (wide area network) interface 304 for coupling with the Internet 106. The gateway device 302A may provide both modem and router functionality, in addition to implementing the telephony adapter 310A. The user interface device 350A includes a wireless interface 352, which provides wireless network connectivity to the wireless interface 308 of the gateway device 302A using, e.g., IEEE 802.11. Thus, the user interface device 350A may be located anywhere within wireless range of the gateway device 302A.

Figure 4:
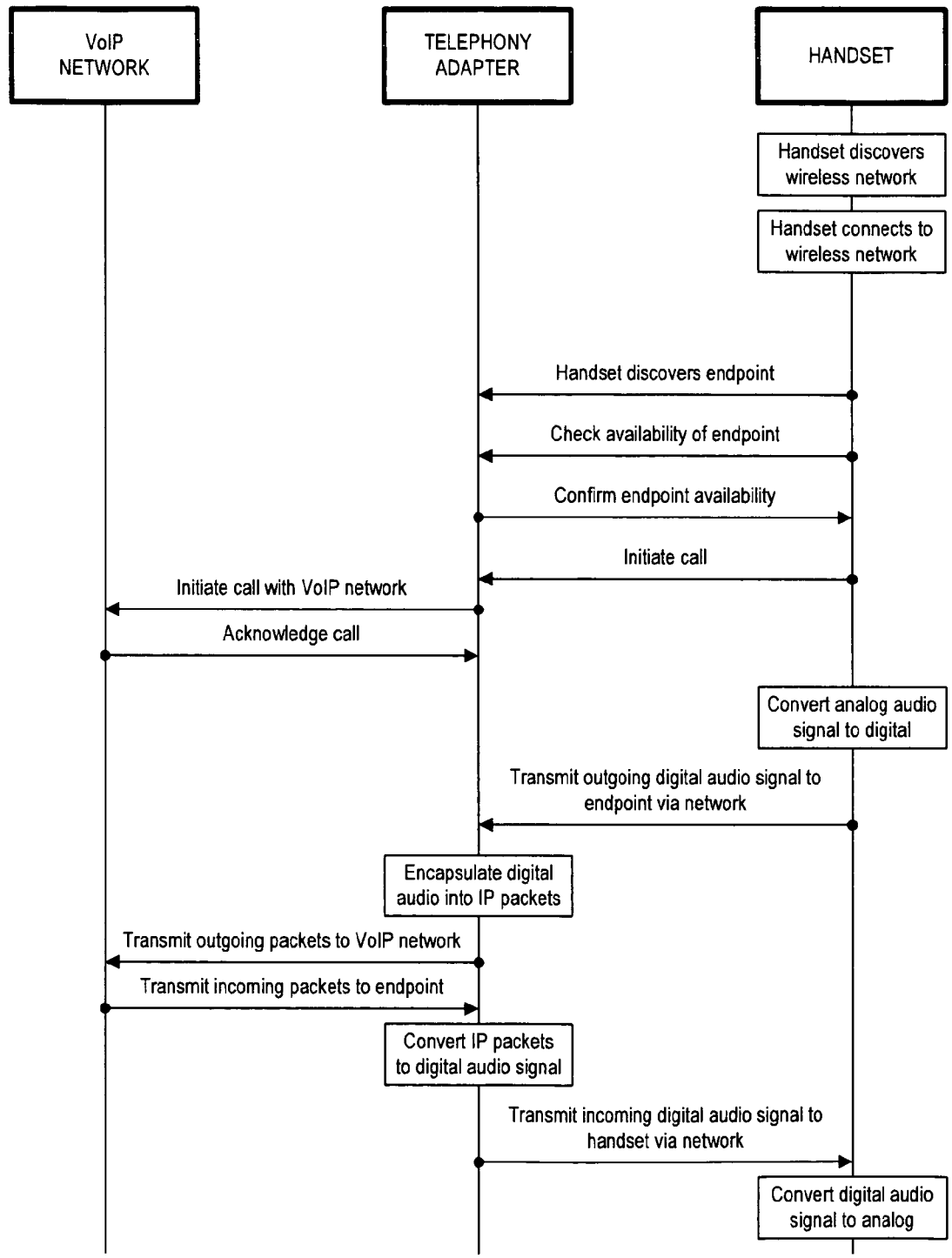
FIG. 4 is exemplary process flow for a telephone call initiated by a user interface device, in accordance with embodiments of the present invention.

FIG. 4 is exemplary process flow for a telephone call initiated by a user interface device 350A (e.g., wireless a telephone handset), in accordance with embodiments of the present invention. First, the user interface device 350A discovers and connects to a network (e.g., a wireless WiFi network). Next, a wireless connection between the endpoint communications module and the client communications module is established. This can be accomplished by the user interface device 350A discovering the telephony adapter 310A or vice versa. The user interface device 350A may be configured to automatically discover all telephony adapters 310A available on the network, and/or the telephony adapter 310A may be configured to automatically discover all available user interface devices 350A on the network Next, the user interface device 350A determines whether the telephony adapter 310A is available to serve as an endpoint for a new VoIP call (e.g., the user interface device 350A determines whether the telephony adapter 310A is idle or busy). If the telephony adapter 310A confirms its availability, the user interface device 350A initiates the call by entering the target telephone number using the numeric keys on the user interface 256. These key presses are received by the telephony signaling module 230, which locates the destination address information needed to route the telephone call through the WAN interface 304 and the Internet 106 to the VoIP gateway 104, which acknowledges the call. The call is then routed via the PSTN 102 to a standard analog telephone number. Alternatively, the call may not utilize the PSTN 102 and may terminate at another VoIP device on the Internet 106. If the telephony adapter 310A is busy, the user interface device 350A may proceed with checking the availability of another telephony adapter on the network.

At the user interface device 350A, the user's voice is detected by (i.e., input to) the microphone 274 and converted into a digital audio signal by the audio processing module 270. This digital audio signal is transmitted to the telephony adapter 310A via the wireless network link between the wireless interface 352 and the wireless interface 308. The voice packet module 272 encapsulates the digital audio signal into IP packets, and then transmits those IP packets to the VoIP gateway 104 via the IP network.

Incoming IP packets from the VoIP gateway 104 are received by the telephony adapter 310A and converted into a digital audio signal. The IP packets correspond to the voice of the person on the other end of the telephone call. This digital audio signal is then transmitted by the client communications module 240 via the wireless link to the user interface device 350A. This digital audio signal is then converted by the audio processing module 270 into an analog audio signal and output by the speaker (i.e. to the user's ear) 272.

Figure 5:
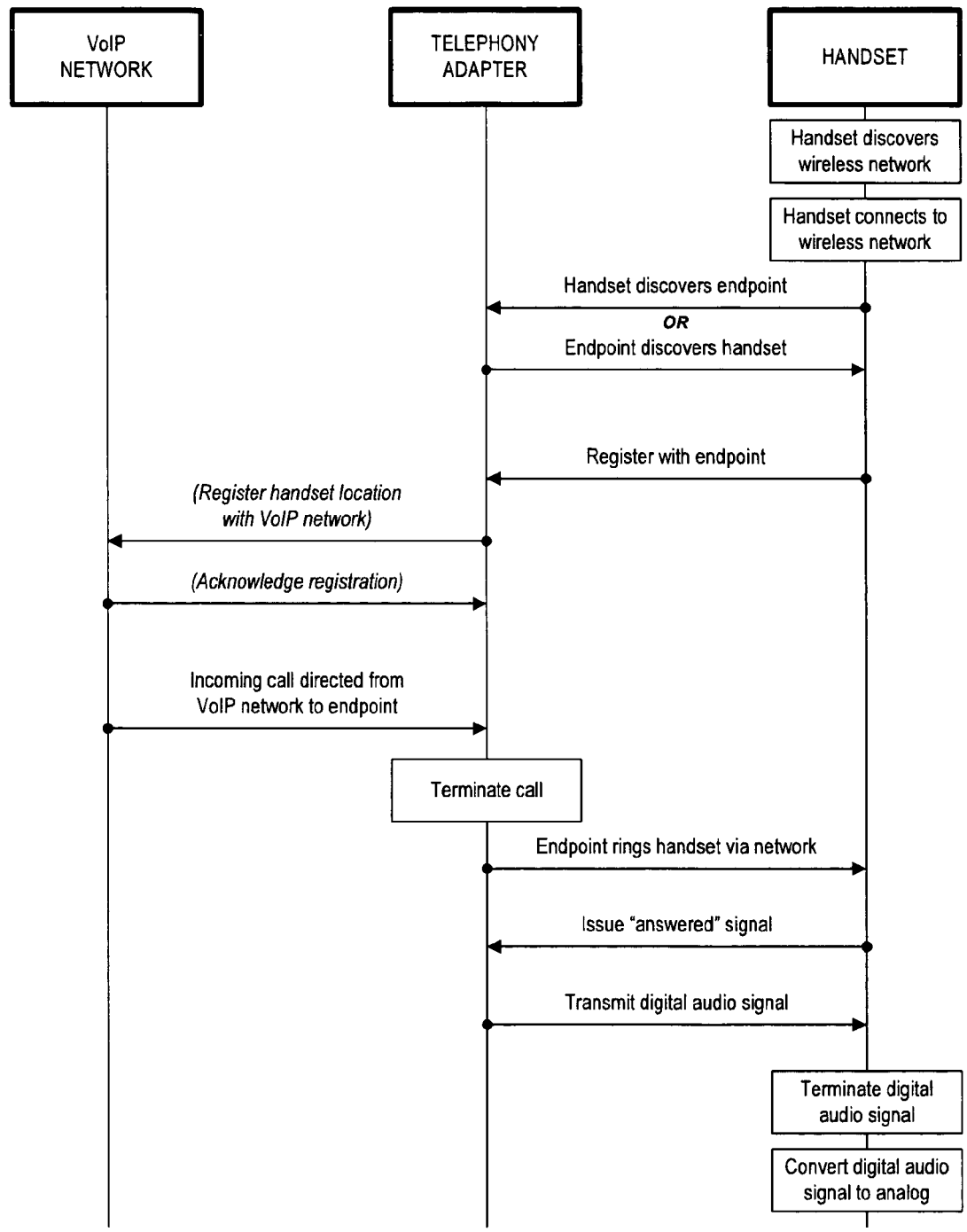
FIG. 5 is exemplary process flow for an incoming telephone call received by the user interface device, in accordance with embodiments of the present invention.

FIG. 5 is exemplary process flow for an incoming telephone call received by the user interface device 350A, in accordance with embodiments of the present invention. First, the user interface device 350A discovers and connects to a wireless network. Next, a wireless connection between the endpoint communications module 260 and the client communications module 240 is established. This can be accomplished by the user interface device 350A discovering the telephony adapter 310A or vice versa. Next, the user interface device 350A registers its location with the telephony adapter 310A to indicate that the user interface device 350A is available to receive incoming telephone calls.

This registration can be performed in a variety of ways. For example, the user interface device 350A may advertise its presence on the LAN 308A, or the telephony adapter 310A may periodically poll the LAN 308A for the presence of user interface devices 350. Once the user interface device is locally registered, the telephony adapter 310A may serve as a proxy for handset registration so that when an incoming call is directed to the user interface device 350A, this call is terminated by the telephony adapter 310A. This registration process may be implemented in a fashion similar to the process by which a cellular telephone base station informs a cellular network that a mobile handset is locally associated with that base station.

The telephony adapter 310A is registered as an endpoint with the VoIP gateway 104. In some embodiments, the telephony adapter 310A may also register with the VoIP gateway 104 to indicate that the user interface device 350A is associated with that telephony adapter 310A. Thus, the telephony adapter 310A indicates to the VoIP gateway 104 that all calls directed to the user interface device 350A should be directed to the telephony adapter 310A as the endpoint. The telephony adapter 310A will then forward incoming calls to the user interface device 350A. In other embodiments, incoming calls from the VoIP gateway 104 are directed to the telephony adapter 310A, without any preregistration of the various user interface devices available on the local network. Once the incoming call is received and terminated by the telephony adapter 310A, the appropriate user interface device is located on the local network and the A/V signal is forwarded to that user interface device.

After the telephony adapter 210 terminates the call, the telephony signaling module 230 issues a signal to the user interface device 250A, causing the user interface device 250A to ring. When a user answers the phone (e.g., by picking up the handset or pressing a button on the user interface 256), an answer signal is transmitted back to the telephony signaling module 230, indicating that the call has been accepted. Incoming audio signals from the IP network are depacketized by the telephony adapter 310A and transmitted to the user interface device 350A. The audio processing module 270 converts the digital audio signal into an analog signal and outputs it using the speaker 272.

Figure 3B:
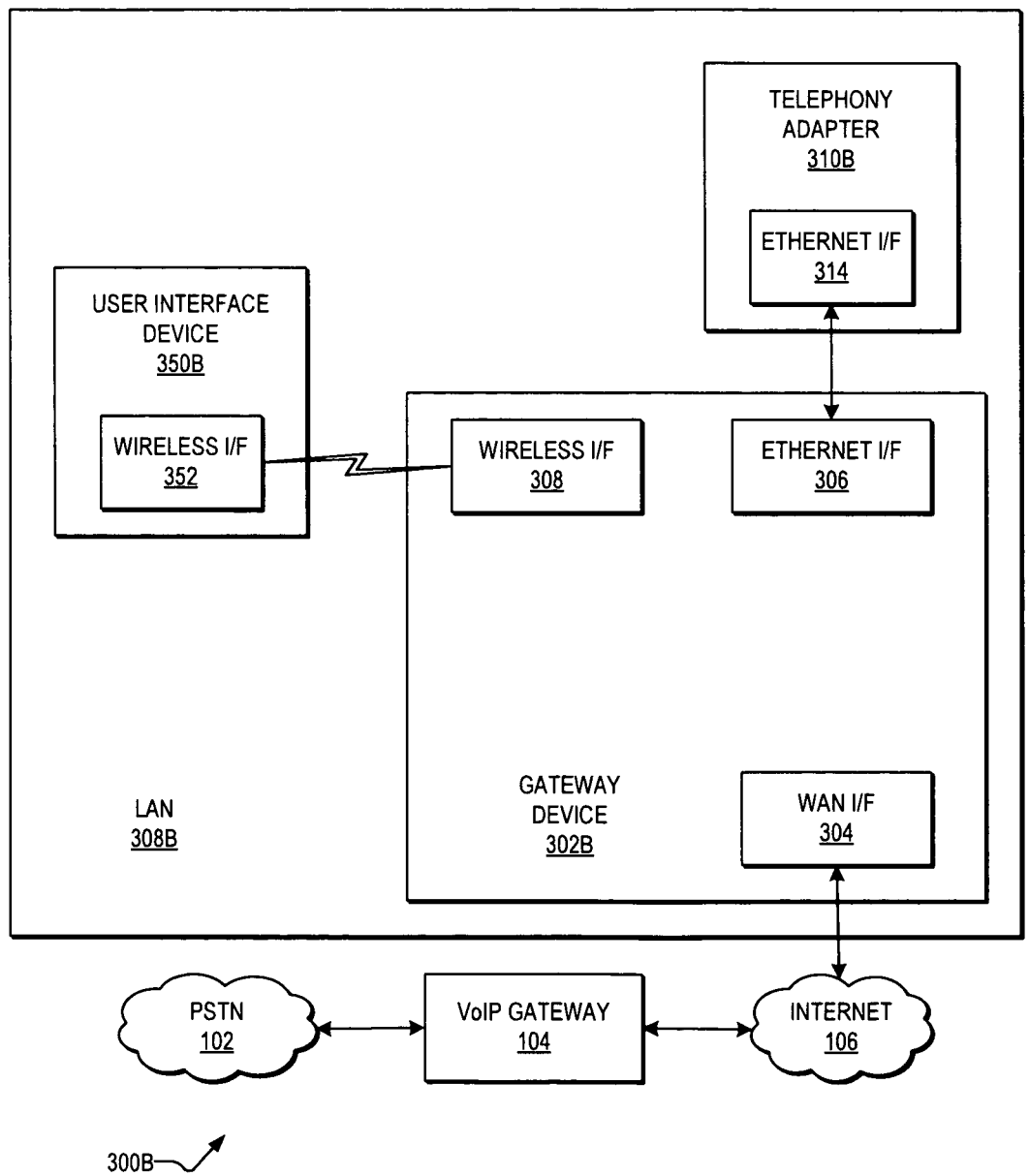

FIG. 3B is a block diagram of a network environment 300B, in accordance with other embodiments of the present invention. In this embodiment, the telephony adapter 310B is a separate physical device from the gateway device 302B and includes an Ethernet interface 314 for establishing network connectivity to the gateway device 302B. The telephony adapter 310B may be implemented as, e.g., a dedicated standalone telephony adapter, or as part of a multi-function device, such as a PC. The user interface device 350B is similar to the user interface device 350A, shown in FIG. 3A, and establishes a network connection to the LAN 308B via a wireless interface 352.

When a user wishes to place a telephone call, the user interface device 350B discovers the presence of the VoIP service on the LAN 308B provided by the telephony adapter 310B. Even though the user interface device 350B does not have a direct connection to the telephony adapter 310B, the user interface device 350B can connect to the telephony adapter 310B via the LAN 308B. The bidirectional digital audio signals and call control signals can be routed by the gateway device 302B between the two devices 350B, 310B, and the telephony adapter 310B can perform all of the VoIP call routing and signal processing functions.

Figure 3C:
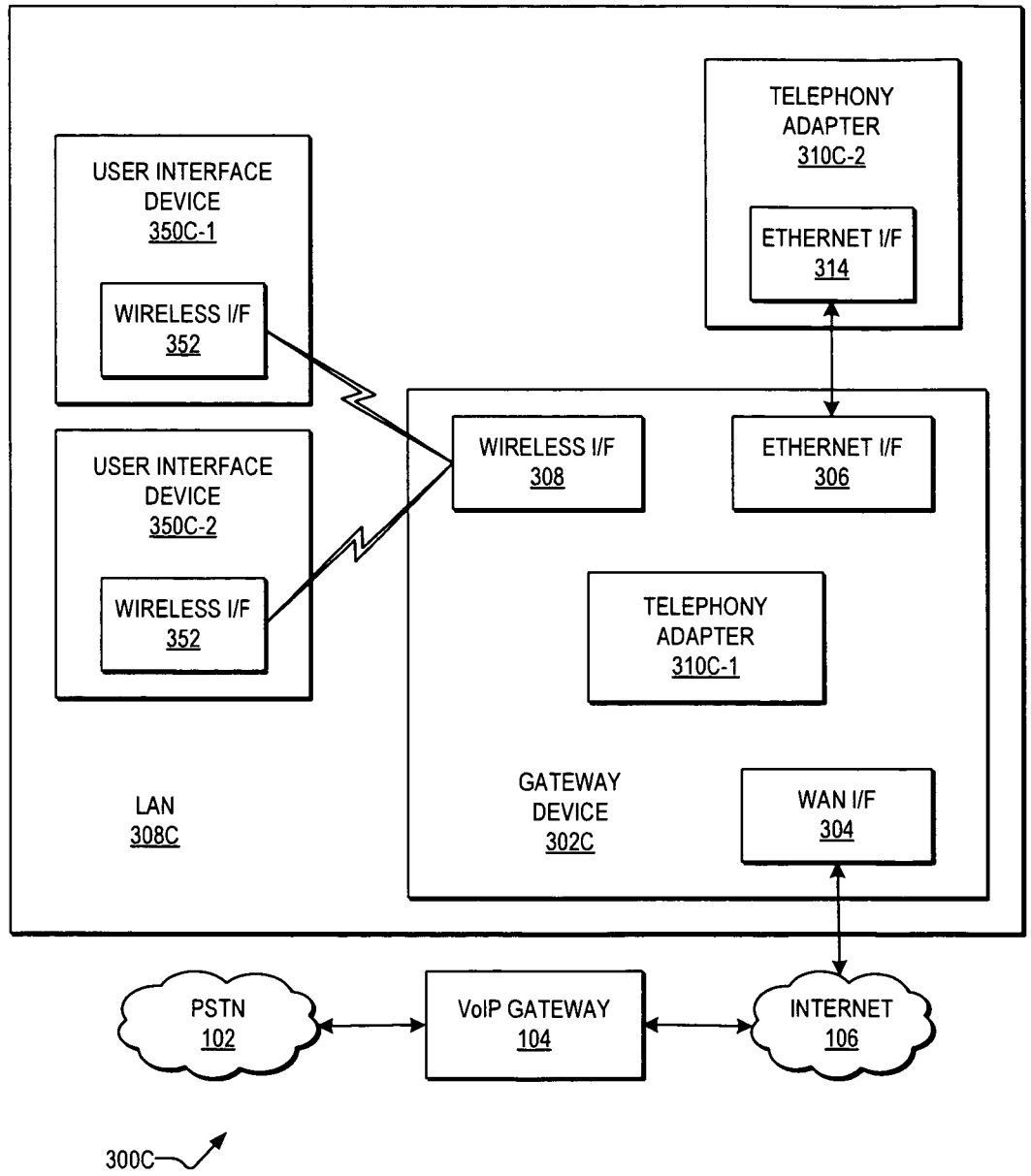

FIG. 3C is a block diagram of a network environment 300C, in accordance with other embodiments of the present invention. In this embodiment, a first telephony adapter 310C-1 is provided as part of the gateway device 302C. A second telephony adapter 310C-2 is also provided on the LAN 308C as a separate device coupled to the gateway device 302C via an Ethernet interface 314. Two user interface devices 350C-1 and 350C-2 are wirelessly connected to the gateway device 302C via wireless interfaces 352.

When a user at the first user interface device 350C-1 wishes to place a telephone call, the first user interface device 350C-1 discovers the presence of VoIP services on the LAN 308C provided by the telephony adapters 310C-1 and 310C-2. When multiple telephony adapters 310 are available on the LAN 308C, the user interface device 350C-1 may be configured to default to a preferred telephony adapter 310, or may be configured to automatically select from the multiple adapters (e.g., by connecting to the first adapter discovered, to the first idle adapter discovered, or to the adapter in closest physical proximity). The call from the first user interface device 350C-1 can then be completed as described above.

If a second user at the second user interface device 350C-2 wishes to place a telephone call, the second user interface device 350C-2 also attempts to discover the presence of VoIP services on the LAN 308C. Because the first telephony adapter 310C-1 is already being utilized to terminate the VoIP call for the first user interface device 350C-1, it is not available to terminate the call for the second user interface device 350C-2. The second user interface device 350C-2 can then search the LAN 308C for other available telephony adapters 310. Alternatively, the second user interface device 350C-2 may automatically discover the presence and status (e.g., idle or busy) of every telephony adapter on the network during the initial discovery process. When the second user interface device 350C-2 discovers the second telephony adapter 310C-2, the user interface device 350C-2 can initiate the VoIP call, as described above with respect to FIG. 3B. For this second telephone call, the gateway device 302C is utilized by the user interface device 350C-2 to route the call control and bidirectional audio signals between the user interface device 350C-2 and the telephony adapter 350C-2; the first telephony adapter 310C-1 is not used.

An advantage of this arrangement is that all of the available telephony adapters 310 on the LAN 308C may be more efficiently utilized. The user interface devices 350 can utilize any of the available telephony adapters 310 to initiate a VoIP call, and the telephony adapters 310 can utilize any of the available user interface devices 350 so that a VoIP call can be answered.

In accordance with other embodiments of the present invention, audio and/or video from a telephony adapter may be received by a user interface device that lacks a user input or a device having a user input that is not used for receiving telephone calls (e.g., keypad or audio microphone). For example, a networked television, DMA (digital media adapter), or stereo may be configured to play audio terminated by the telephony adapter.

Figure 3D:
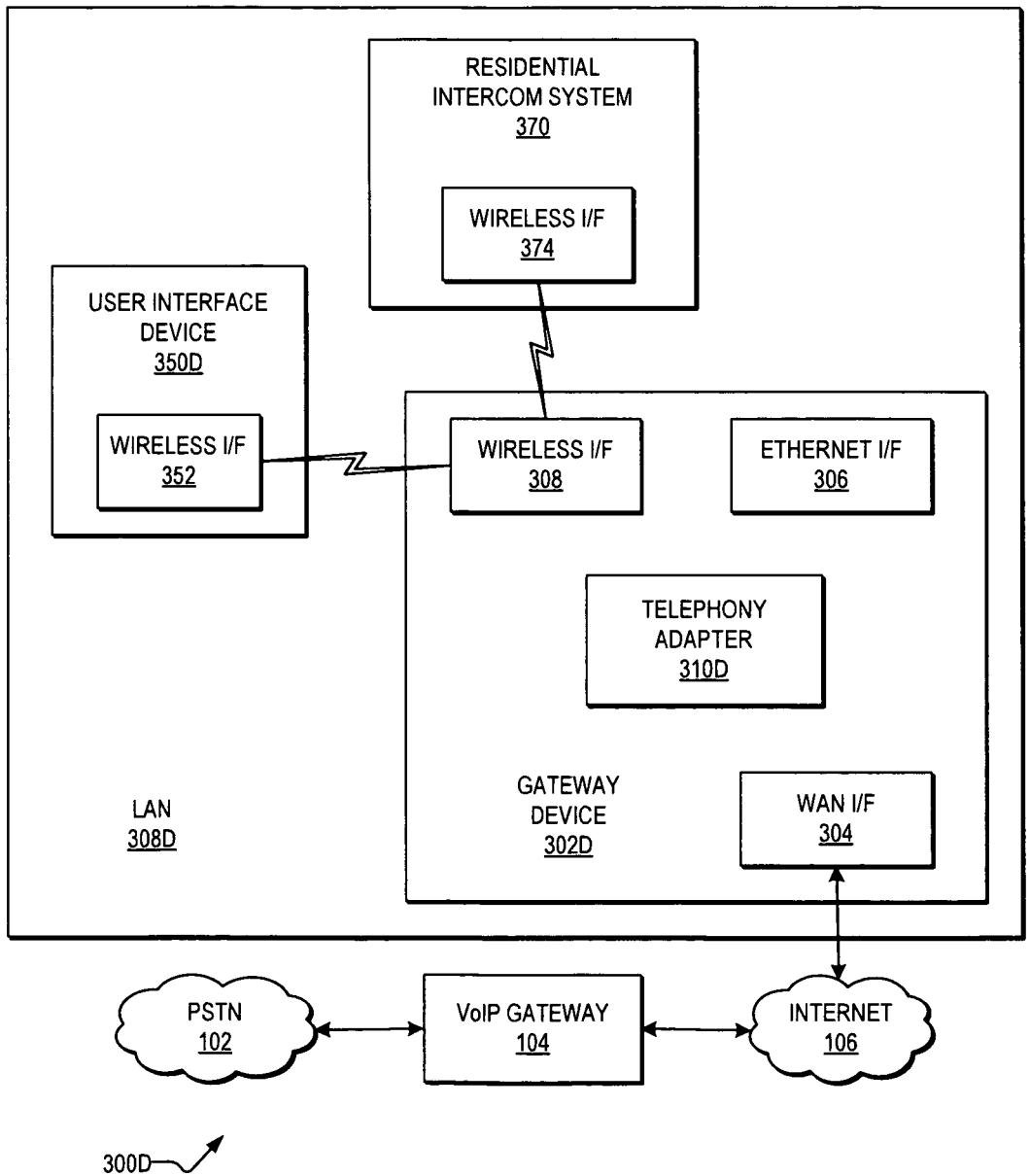

FIG. 3D is a block diagram of a network environment 300D, in accordance with other embodiments of the present invention. In this embodiment, a user interface device may be implemented in a device lacking a user input (e.g., a residential intercom system 370). The telephony adapter 310D terminates an incoming VoIP telephone call and directs the audio signal to the residential intercom system 370 via a wireless interface 374. Thus, an incoming VoIP audio stream can be sent to a device not traditionally capable of playing live telephone calls. In one example, a user may place a telephone call to a phone number associated with some device located in the user's house. The telephony adapter 310D terminates the VoIP call and outputs the audio signal (e.g., the user's voice) over the target device, e.g., an intercom system, television, stereo, DMA, or other networked device.

In some embodiments, the telephony adapter 310D may be configured to direct the calls to alternate devices if the primary target device is unavailable. For example, if an incoming telephone call is directed to the telephone handset user interface device 350D, and the user interface device 350D is unavailable (e.g., if the device 350D is powered down), then the telephony adapter 310D may direct an audio stream to the intercom system 370, television, or other nearby device. The audio stream may include a prerecorded message instructing the user to turn on the user interface device 350D, or may be the incoming audio signal from the telephone call. The telephony adapter 310D may also be configured to transmit the audio signal to a series of fallback alternate devices, in the event that the intercom system 370 is unavailable. The series of alternate devices may be configured by the user in advance, or may be selectable during the call by the caller. For example, the telephony adapter 310D may terminate the call and present the caller with an audio menu of target devices for connection. Thus, the caller may select "1" to output on the living room television, or "2" to output in the stereo in the kitchen.

In yet other embodiments, the incoming signal may be directed to a first user interface device and the outgoing signal may originate from a second user interface device. For example, an incoming audio and/or video call may be terminated by a telephony adapter, which transmits the incoming audio/video signal to a first user interface device having only output capability (e.g., a television or stereo). The receiving user may then utilize a second user interface device having only input capability (e.g., a wireless microphone, digital camera, or webcam) in order to respond to the call. Because the call is terminated by the telephony adapter, the division of functionality between multiple user interface devices is transparent to the caller.

In accordance with other embodiments of the present invention, systems may be provided for other types of session-based audio/video transmissions to slim client devices. For example, an advertising device in a retail location may be provided with a telephony adapter for detecting the presence of slim clients. The telephony adapter may then push advertisements to the passing users by effectively "calling" the user interface devices, as described in the embodiments above, and initiating an audio-visual data transfer. These slim clients can be, e.g., PDAs (personal digital assistants), telephone handsets, DMAs, or other devices capable of receiving an audio/video stream that have been preregistered to receive advertisements. The advertisements may include text, graphics, audio, and/or video and may comprise, e.g., in-store coupons, music clips (for a music store), audio book clips (for a bookstore), or movie trailers (for a video store).

In yet other embodiments, two user interface devices may communicate directly with each other. Thus, the applications may expand beyond the server/client relationship between the telephony adapter and the user interface device, and allow client/client networks between individual users. Thus, individual portable devices may share and/or trade information (e.g., coupons or advertisements) simply by proximity.

In accordance with some embodiments, security and privacy concerns may be addressed by allowing user interface devices to selectively enable or disable the receiving of calls from certain types of telephony adapters. For example, a user may opt out of all commercial advertisements by configuring the user interface device to block all such calls.

Embodiments of the present invention may be implemented in any of a variety of network topologies. For example, in a mesh network architecture, the VoIP endpoints may be co-located with mesh routers, and handsets are implemented as mesh endpoints. Thus, the mesh network can locate the path from a handset to the closest available VoIP endpoint.

In accordance with some embodiments, the handset may store a small amount of personalization information for the user, while the bulk of the user's personal data is stored elsewhere on the network to be retrieved by the user interface device and/or the telephony adapter when needed. For example, the user identity (e.g., telephone number or login name) may be stored on the slim client handset, while contact lists may be maintained in a central server.

Embodiments of the present invention may provide various advantages not provided by prior art systems. In particular, by implementing the VoIP signaling stack and CODECs in the telephony adapter 210, the user interface device 250 may be implemented in low cost fashion using any device that provides a network connection and bidirectional audio capability. Alternatively, the user interface device 250 could implement an advanced CODEC that is not used by the telephony adapter 210. This would allow the telephony adapter 210 to use the bidirectional audio stream as is and possibly provide an improved user experience.

In addition, the technical challenges typically associated with managing locally roaming voice handsets may be significantly mitigated. The telephony adapter implements the VoIP endpoint, not the user interface device. The user interface device functions as an extension of the audio media path which is established or terminated at the VoIP endpoint in the telephony adapter. Thus, the concept of "local" roaming (i.e., on a single premises) is effectively equivalent to momentarily unplugging an audio I/O device (e.g., a microphone/speaker headset) from one socket and plugging it into another socket. In other words, because the telephone call is terminated at the telephony adapter, the continuous connection between the user interface device and the telephony adapter need not be required in order to maintain the telephone call. Thus, the call can maintain a fixed termination point at the telephony adapter, while the audio path from the telephony adapter to the user interface device may be interrupted or change between multiple sets of microphones and speakers. Furthermore, the bidirectional audio path between the telephony adapter and the user interface device would not be required to use the same audio CODEC in each direction. For example, the user interface device and the destination device may both be provided with CODECs for processing stereo quality audio. However, the telephony adapter may only be provided with CODECs for processing telephone quality audio. The signal from the user interface device may still be processed by the telephony adapter and routed over the Internet.

In addition, because the user interface device and the telephony adapter are connected over a LAN, the connection may be temporary and configurable, thus enabling improved portability and flexibility. In contrast, conventional cordless phones are associated with a particular base station and communicate over a fixed RF signal, rather than a network.

In addition, systems in accordance with the present invention may provide VoIP functionality for multiple user interface devices without centralized VoIP signaling or voice coding. Thus, these systems may be conceptualized a distributed private branch exchange (PBX).

While the invention has been described in terms of particular embodiments and illustrative figures, those of ordinary skill in the art will recognize that the invention is not limited to the embodiments or figures described. For instance, some of the examples provided above describe the use of one or more telephony adapters in a home or small office setting. In other embodiments, the telephony adapters may be implemented in a business or public setting. For example, a public venue may host a WiFi hotspot including plurality of VoIP telephony adapters, which would advertise themselves as a VoIP service to users of the hotspot. A guest or visitor to that public venue could activate their handset, discover the service (e.g., by actively inquiring for the service), and place a telephone call using any available telephony adapter. In other embodiments, the handset may subscribe to a service that enables the handset to passively discover the existence of all available telephony adapters by listing for their advertisements. After the handset has been activated and registered by a telephony adapter, the telephony adapter can relate the location of the handset to the VoIP network, thereby enabling subsequent calls directed to that handset to be forwarded via that telephony adapter.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A voice over IP (VoIP) communications system, comprising:
    a plurality of telephony adapters each comprising:
        a VoIP module for terminating and signaling a VoIP call;
        a client communications module configured to:
            transmit first digital audio signals to a user interface device over a same local area network (LAN);
            receive second digital audio signals from the user interface device; and
            provide the user interface device with an availability status for receiving the second digital audio signals over the same LAN,
    wherein the user interface device is configured to search the same LAN for an available one of the plurality of telephony adapters based on the availability status and to transmit the second digital audio signals to the available telephony adapter, and wherein the user interface device lacks VoIP signaling and termination functionality; and a voice packet module configured to:
receive the second digital audio signals from the client communications module and encapsulate the second digital audio signals into first data packets to be transmitted by the VoIP module; and
convert second data packets from the VoIP module into the first digital audio signals and transmit the first digital audio signals to the client communications module, wherein the client communications module is configured to direct telephone calls from the VoIP module directed to any of a plurality of user interface devices and, in response to receiving a telephone call from the VoIP module for a first user interface device of the plurality of user interface devices, to locate the first user interface device on the same LAN.

2. The system of claim 1, wherein: the client communications module is configured to register as a service for the same LAN.

3. The system of claim 1, wherein: the client communications module is further configured to direct audio signals associated with the telephone call to the first user interface device.

4. The system of claim 1, wherein the plurality of telephony adapters each comprise:
a telephony signaling module coupled for receiving call control information from the client communications module and the VoIP module.

5. The system of claim 1, wherein the client communications module is further configured to:
receive a registration from the user interface device; and
identify a location of the user interface device to a VoIP gateway.

6. The system of claim 1, wherein the plurality of telephony adapters each comprise:
a wireless interface for communicating with the user interface device.

7. The system of claim 1, wherein:
the voice packet module is further configured to:
convert the second data packets into first video signals and transmit the first video signals to the client communications module.

8. The system of claim 7, wherein:
the voice packet module is further configured to:
receive second video signals from the client communications module and encapsulate the second video signals into the first data packets.

9. A method of providing packet-based communications using a plurality of telephony adapters, the method comprising:

providing to a user interface device an availability status for receiving first digital audio signals on a same local area network (LAN), wherein the user interface device is configured to search the same LAN for an available one of the plurality of telephony adapters based on the availability status;

establishing a communications session over an Internet Protocol (IP) network between the available telephony adapter and a target device, wherein the user interface device lacks Voice over IP (VoIP) signaling and termination functionality;

receiving the first digital audio signals at the available telephony adapter from the user interface device via the same LAN;

encapsulating the first digital audio signals into data packets;

transmitting the data packets to the target device via the IP network;

directing telephone calls from a VoIP endpoint to any of a plurality of user interface devices; and in response to receiving a telephone call for a first user interface device of the plurality of user interface devices, locating the first user interface device on the same LAN.

10. The method of claim 9, wherein:
the communications session comprises a Voice over Internet Protocol (VoIP) telephone call.

11. The method of claim 9, further comprising:
receiving incoming data packets from the target device via the IP network;
converting the incoming data packets into second digital audio signals; and
transmitting the second digital audio signals to the user interface device.

12. The method of claim 9, further comprising:
receiving a VoIP telephone call from the IP network for the user interface device;
locating the user interface device on the same LAN; and
terminating the VoIP telephone call.

13. The method of claim 12, further comprising:
directing audio signals associated with the VoIP telephone call to the located user interface device.

14. The method of claim 9, further comprising:
receiving a registration from the user interface device; and
identifying a location of the user interface device to a VoIP gateway.

15. The method of claim 9, wherein:
said receiving the first digital audio signals at the available telephony adapter from the user interface device comprises receiving the first digital audio signals via a wireless interface.

* * * * *